United States Patent Office 3,313,780
Patented Apr. 11, 1967

3,313,780
PROCESS FOR THE PRODUCTION OF HIGH MOLECULAR WEIGHT POLYOXYMETH-YLENES
Kuno Wagner and Ernst-Ulrich Köcher, Leverkusen, Germany, assignors to Farbenfabriken Bayer Aktiengesellschaft, Leverkusen, Germany, a corporation of Germany
No Drawing. Filed Sept. 25, 1963, Ser. No. 311,296
Claims priority, application Germany, Oct. 13, 1962,
F 38,026
4 Claims. (Cl. 260—67)

This invention relates to a process for the production of high molecular weight polyoxymethylenes by the polymerization of formaldehyde, compounds of divalent tin being used as catalysts.

It is known that practically anhydrous, highly purified formaldehyde having a water content of less than 0.05% can be polymerized with the aid of numerous catalysts such as boron trifluoride, oxonium salts, tertiary and quaternary nitrogen bases, metal salts, metal alcoholates, organometallic compounds, sulphonium salts, phosphonium salts etc. in inert solvents to produce high molecular weight polyoxymethylenes. It is further known that formaldehyde gases having a relatively high water content can be polymerized to high molecular weight polyoxymethylenes with the aid of special catalysts. In this case, impure formaldehyde having a water content of about 0.5 to 5% is introduced into an inert organic solvent or into a solvent having an acylating or an alkylating action or it is passed over high molecular weight polyoxymethylene in the absence of solvents, and special catalysts, preferably compounds of divalent tin, are added to the polymerization mixture. With this method, the chain breaking reactions due to water and other impurities may be slowed down considerably so that high quality polyoxymethylenes having internal viscosities of about 0.6 to 3 (measured in dimethylformamide or butyrolactone at 150° C. in 0.5% solution), corresponding to average molecular weights of about 30,000 to 150,000, may be obtained.

Among the various divalent tin compounds it is mainly the divalent tin salts of organic carboxylic acids as well as freshly prepared, colloidal dissolved divalent tin hydroxides which have hitherto been of practical importance in the polymerization of formaldehyde. With numerous other divalent tin compounds, both inorganic and organic, it has not been possible to confirm the exceptional properties of the divalent tin radical as initiator in the polymerization of formaldehyde, so that one had to assume that the anion of the catalyst, i.e. mainly the acyl radicals of organic carboxylic acids, are of decisive importance in the polymerization processes (chain starting, chain breaking, transfer reactions) of the polymerization reaction which is disturbed relatively little by water. Although these catalysts, which may be prepared, for example from divalent tin chloride and which could hitherto not be used, are highly active polymerization catalysts for highly purified formaldehyde, they have only been able to produce polyoxymethylenes similar to paraformaldehyde when used as catalysts for the polymerization of formaldehyde vapours which contain water.

It has been found that the reason why numerous divalent tin compounds cannot be used in the process of the cited prior patents is that when divalent tin compounds are prepared from divalent tin chloride they usually contain small quantities of dissociable halogen compounds as well as portions of soluble alkali salts and more or less large quantities of tetravalent tin compounds. The increased proportion of tetravalent tin compounds is due to the fact that the liability of divalent tin to oxidise has hitherto not been sufficiently taken into account in the preparation of catalysts. The first two mentioned impurities will seriously impair the polymerization process even when present only in quantities of a few milligrams per litre of polymerization medium, and the third component, namely the tetravalent tin compounds, also seriously reduces the catalytic effect of the catalyst if present in proportions of more than 10% calculated on the divalent tin. The chain breaking reactions released by the said impurities have the effect that the good property of the divalent tin catalysts of rapidly encouraging polymerization when the chain breaking reactions are relatively strongly retarded, is completely masked by the influence of the impurities.

The object of this invention is a process for the production of high molecular weight polyoxymethylenes by the polymerization of formaldehyde containing impurities in which divalent tin compounds of the formula

are used as catalysts, in which formula R represents the radical of a methylol compound of an organic, aliphatic, cycloaliphatic, araliphatic or aromatic carboxylic acid or dithiocarbaminic acid. These formaldehyde addition products consist of 2 mols. of formaldehyde and 1 mol. of divalent tin salt of the corresponding acid.

To carry out the process, gaseous formaldehyde containing impurities, for example 0.5 to 3% water, may be polymerized in inert solvents, in acylating agents, in alkylating agents or in the gaseous phase over a large surface, e.g. over polyoxymethylene at normal pressure, elevated pressure or pressures below 760 mm. Hg, if desired with the use of inert gases such an nitrogen or inert vapours of organic liquids, e.g. toluene, in the presence of catalytic quantities of the said divalent tin compounds.

The following are examples of compounds which may be used as catalysts: The divalent tin compounds of methylol-N-methyl-N-stearyl-dithiocarbaminic acid, of methylol-N:N-diphenyl-dithiocarbaminic acid, of methylol-N:N-dibutyl-dithiocarbaminic acid, of methylol-N-phenyl-N-methyl-dithiocarbaminic acid. The use of these catalysts results in a polymerization which begins immediately and proceeds rapidly and uniformly as soon as concentrations of 0.2 to 0.8% formaldehyde are present in a very large variety of inert solvents. Addition products of 2 mols. of formaldehyde and 1 mol. of divalent tin salts of organic carboxylic acids are also regarded as compounds of the constitution

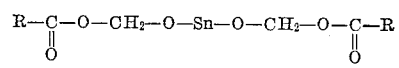

Examples of these active catalysts are formaldehyde addition products of salts of divalent tin with formic acid, acetic acid, propionic acid, butyric acid, 2-ethyl-caproic acid, palmitic acid, stearic acid, oleic acid, alkylated benzoic acids, alkylated salicylic acids, phenylacetic acid, cyclohexanecarboxylic acid or other aliphatic, cycloaliphatic, aromatic, araliphatic carboxylic acids, which may be substituted, for example by halogen-, nitro-, hydroxy-, etherified hydroxy- and alkyl groups. In addition there may be mentioned the formaldehyde addition products of divalent tin salts of polycarboxylic acids such as those of hexahydrophthalic acid and tetrapropenyl succinic acid.

With the aid of these new divalent tin catalysts having a higher degree of purity, it is possible to use, for the polymerization process, relatively impure formaldehyde such as that obtainable, for example, by pyrolysis of paraformaldehyde or α-polyoxymethylene, without any intermediate purification, for example by freezing, preliminary polymerization or other measures, and this impure formaldehyde can be converted into high molecular weight polyoxymethylenes having valuable technological properties.

As already indicated above, this finding is particularly surprising because when similar catalysts are used having halogen contents of only 0.5%, alkali contents of only 0.3% and Sn-IV contents of 15–20% for the polymerisation, in various polymerisation media, of formaldehyde vapours obtained by decomposition of paraformaldehyde, only very low molecular weight polyoxymethylenes similar to paraformaldehyde are obtainable. It has been found that divalent tin compounds which contain small amounts of Sn—Cl groups, e.g. in the form of

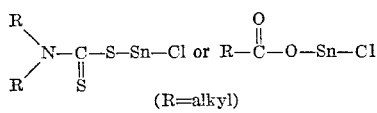

are particularly disturbing in the polymerization process because the chain breaking reactions due to water and other impurities then proceed much more rapidly and therefore do not enable high molecular weight polyoxymethylenes to be formed.

These catalysts at the same time also give increased protection against oxidation reactions and lead to products which have a reduced ash content (often due to $SnO_2$) after they have been acetylated or etherified, whereby the thermostability of the polyoxymethylenes stabilized in the end groups is increased.

To carry out the process according to the invention, it is preferable to operate with formaldehyde vapours which contain about 0.5 to 1% of water and about 0.3% of methanol. A formaldehyde of this degree of impurity can be obtained in a simple manner by the pyrolysis for example of paraformaldehyde having a water content up to 1%, with or without heat transfer agents. The gases produced in pyrolysis are then transferred at temperatures of about 90 to 150° C. into ohe polymerization vessel, if desired at reduced or elevated pressure, care being taken to avoid any preliminary polymerization. A good source for the preparation of formaldehyde vapours which contain methanol and which have a lower water content are also formaldehyde gases obtained in the dehydrogenation of methanol in the absence of hydrogen acceptors. It is sometimes desirable to free such gases from traces of coloured, easily volatile unknown substances by washing them in solvents heated above 90° C. or to remove fumaric acid by suitable measures if this is present in large quantities, and again any preliminary polymerization is prevented by employing sufficiently high temperatures.

In carrying out the polymerization process according to the invention it is important to introduce the formaldehyde gradually into the polymerization medium and to stimulate polymerization continuously by supplying fresh catalyst. This increases the yield of high molecular weight polyoxymethylene. A quantity of 0.000015 to 0.01 mol., preferably 0.0001 to 0.002 mol. of catalyst per mol. of formaldehyde is generally used, when the polymerization is carried out in inert or alkylating solvents. If, on the other hand, the polymerization is carried out in acetic anhydride or other acylating agents, it is preferable to use much higher concentrations, namely 0.001 to 0.006 mols. of catalyst per mol. of formaldehyde. In the polymerization in acetic anhydride, moreover, it is advantageous to use formaldehyde vapours having a water content below 1% because otherwise the free acetic acid formed in the course of polymerization has an increasingly disturbing chain breaking effect.

The catalyst are preferably used in the form of 0.01 to 1% solutions in inert, acylating or alkylating solvents, for example in methylene chloride, 1:2-dichloropropane, carbon tetrachloride, aromatic hydrocarbons such as toluene, ethyl acetate, acetic anhydride, orthofumaric acid ethyl ether, formaldehyde-dimethylacetal. The catalyst should be added as uniformly as possible in equal doses over the whole polymerization time. The rate of addition of catalyst is, of course, variable and depends on the flow velocity at which the formaldehyde is introduced into the polymerization vessel. In a discontinuous process, it is advantageous for example to introduce 30 to 70% of the required catalyst solution at the beginning and then to add the remaining quantities in doses with a dosing pump over the whole polymerization time. Exact and continuous dosing of the catalyst is important because the formaldehyde which may, for example, contain 2.5% water and 0.1 to 0.3% formic acid introduces impurities which are themselves catalytic. This catalytic activity, however, becomes practically negligible owing to the much higher activity of the divalent tin compounds provided these compounds are present in sufficiently high concentration in the polymerization mixture.

If the polymerization is carried out in inert solvents, then aromatic, araliphatic, cycloaliphatic and/or aliphatic hydrocarbons and their halogenation products may be used as solvents. However, it is preferable to work in methylene chloride because this is an excellent solvent for the very low molecule weight formaldehyde hydrates formed in the process and because this solvent can be prepared in a very high degree of purity. It is also possible to use solvents such as 1,3-dichloropropane. Carbon tetrachloride and chloroform may also be used for the polymerization if they are sufficiently free from hydrogen chloride and from phosgene.

If the polymerization is carried out in acylating agents, it is preferable to employ acetic anhydride, if desired mixed with other solvents. However, other acylating agents may also be used.

If the polymerization is carried out in alkylating agents, it is preferable to use orthoformic acid ethyl ester as solvent.

The quantity of solvent used may vary within wide limits. It is generally advisable to use about 7 to 12 parts by volume of solvent to 1 part by weight of formaldehyde. The catalyst is generally dissolved in the same solvent as that in which the polymerization is carried out.

The polymerization may be carried out in a temperature range of −120° to +150° C. It is often advantageous to employ temperatures between −20 and +90° C.

The flow velocity with which the formaldehyde vapours are passed over or introduced into the polymerization vessel is variable and depends on the speed of pyrolysis as well as on the temperature conditions in the polymerization vessel.

If the polymerization has been carried out in inert solvents, the polymer is separated from the solvent by filtration or centrifuging. The process may be carried out continuously or semi-continuously. Fresh solvent and fresh catalyst may be introduced into the polymerization vessel at a rate corresponding to the removal of polymer.

If the polymerization has been carried out in acylating solvents, acylating catalyst are added to the reaction mixture when polymerization is completed, and the mixture is heated to temperature above 100° C. in order to convert all the end groups and to remove residues of catalyst.

The great advantage of the process according to the invention compared with polymerization processes hitherto known is that formaldehyde having a relatively high water content may be polymerized to high molecular weight polyoxymethylenes, any purification of formaldehyde vapours by preliminary polymerization and the difficult continuous removal of the preliminary polymer being completely dispensed with. Another important advantage lies in the easy accessibility of the impure formaldehyde used for the polymerization. Further advantages of the process according to the invention lie in the fact that residues of catalyst can be removed more easily from the high molecular weight polyoxymethylenes, whereby the thermostability and the colour properties of the polymer are improved, particularly after working up. Further advantages consist in the improved possibility of chain control and the production of high molecular weight polyoxymethylenes which are more easily worked up.

The high molecular weight polyoxymethylenes prepared by the process according to the invention and stabilised by the above methods can be worked up into high quality synthetic resins, with or without the addition of other substances. Such substances are, for example, heat stabilisers, antioxidants, plasticisers, fillers, pigment dyestuffs, light protective agents, optical brightening agents and the like.

In the following examples, the parts given for the solvents are parts by volume and the other parts are parts by weight.

EXAMPLE 1

140 parts by weight of paraformaldehyde having a water content of 0.65% are decomposed at 124 to 140° C. in an inert heat transfer agent consisting of mepasin, in a round bottomed flask. The hot formaldehyde vapours pass through a double walled tube of VA steel heated with steam to about 100° C., and through a lid also heated with steam and equipped with a thermometer and stirrer and provided with an outflow tube, into a cylindrical reaction vessel. The reaction vessel has a cross-section of about 12 cm. and a capacity of 2000 cc. and is connected with the hot lid through an insulating seal. The outlet of the heated VA tube is about 2 cm. above the liquid level of the polymerization medium. The outlet tube of the heated lid is connected with a Wulf's flask which contains water as covering and receiving liquid and is secure against excess pressure by means of a small ascending tube. The polymerization medium consists of 1000 parts by volume of acetic anhydride containing 0.35% of free acetic acid and it contains 2 parts by weight of a catalyst having the following constitution:

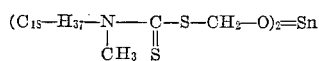

In the course of polymerization, a further 0.6 part by weight of the same catalyst dissolved in 30 parts by volume of methylene chloride are added to the polymerization mixture, the addition being uniformly distributed over the whole polymerization time.

Yield: 98 parts by weight of high molecular weight polyoxymethylene.

The acylated products have the following internal viscosity (measured in butyrolactone at 150° C. in 0.5% solution):

$$\eta_i := 0.83$$

Preparation of catalyst:
20 parts by weight of the compound

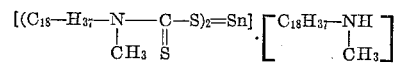

are dissolved in 1000 parts by volume of methylene chloride. Highly purified anhydrous formaldehyde is introduced at room temperature in the presence of a highly purified stream of nitrogen which is free from oxygen, the mixture being thoroughly stirred at the same time. The intensely yellow coloured solution decolourises as formaldehyde is introduced, and when about 15 parts by weight of formaldehyde have been introduced the solution is again almost completely colourless. Methylene chloride and excess formaldehyde are removed by distillation in vacuo, and the concentrated methylene chloride solution is added dropwise into methanol. A powdery substance is thereby obtained, which no longer smells of formaldehyde after drying in vacuo, but on analysis it is found to contain 2 mols. of formaldehyde to 1 mol. of tin-dithiocarbaminate compound. After again precipitating the compound from methanol, small quantities of methylene-di-(stearyl-methyl-amine) present as impurity are removed practically completely and the catalyst is used for polymerization according to Example 1.

EXAMPLE 2

In a parallel experiment, the catalyst mentioned in Example 1 is replaced by the following catalyst which is free from sulphur:

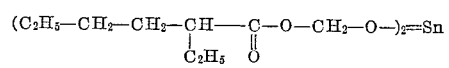

The yield is 101 parts by weight of high molecular weight polyoxymethylene.

The acetylated products have the following internal viscosity (measured in butyrolactone at 150° C. in 0.5% solution):

$$\eta_i := 1.35$$

Preparation of the catalyst:
20 parts by weight of tin-II-octoate are dissolved in methylene chloride and treated as in Example 1 with highly purified formaldehyde. After carefully driving off the excess formaldehyde, a syrupy liquid easily soluble in organic solvents and containing about one equivalent of formaldehyde bound to about one equivalent of tin remains behind. Owing to the stability of the compound, the reaction product is not an addition complex but a true Sn-semiacetal derivative of the formula

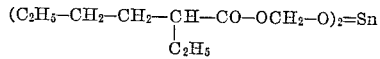

EXAMPLE 3

The process is carried out as in Example 1, the following tin-II compounds being used as catalyst:

| Experiment | Catalyst | Quantity in parts by weight | Polymerisation medium |
|---|---|---|---|
| (a) | $[(C_6H_5)_2N-\underset{\underset{S}{\|}}{C}-S-CH_2-O]_2=Sn$ | 0.8 | Orthoformic acid ethyl ester. |
| (b) | $[(C_4H_9)_2N-\underset{\underset{S}{\|}}{C}-S-CH_2-O]_2=Sn$ | 0.65 | Toluene. |
| (c) | $(C_6H_5-\underset{\underset{CH_3}{\|}}{N}-\underset{\underset{S}{\|}}{C}-S-CH_2-O)_2=Sn$ | 0.8 | Methylene chloride. |
| (d) | $(CH_3-CH_2-CH_2-\underset{\underset{O}{\|}}{C}-O-CH_2-O)_2=Sn$ | 0.75 | Acetic anhydride. |
| (e) | $(C_6H_5-CH_2-\underset{\underset{O}{\|}}{C}-O-CH_2-O)_2=Sn$ | 0.95 | Benzene. |
| (f) | (cyclohexyl)$-\underset{\underset{O}{\|}}{C}-O-CH-O)_2=Sn$ | 1.2 | Methylene chloride. |
| (g) | $\left(C_6H_5-\underset{\underset{O}{\|}}{C}-O-CH-O\right)_2=Sn$ | 0.9 | Do. |

The polymerisation is carried out according to Example 1, and after acetylation or etherification with orthoformic acid ethyl ester (Experiment (a)), polyoxymethylenes having the following internal viscosities (measured in butyrolactone at 150° C. in 0.5% solution) are obtained in the following yields:

| Experiment | Yield | Internal viscosity |
|---|---|---|
| (a) | 67 parts by weight | 0.72 |
| (b) | 106 parts by weight | 0.13 / 0.93 |
| (c) | 95 parts by weight | 1.35 |
| (d) | 91 parts by weight | 1.3 |
| (e) | 93 parts by weight | 1.25 |
| (f) | 102 parts by weight | 1.19 |
| (g) | 93 parts by weight |  |

The preparation of catalysts (a) to (g) is carried out by the methods according to Examples 1 and 2 from the corresponding divalent tin salts of dithiocarbaminic acids or organic carboxylic acids and excess formaldehyde.

We claim:
1. A process for the production of high molecular weight polyoxymethylene which comprises polymerizing monomeric gaseous formaldehyde containing from 0.5 to 3% by weight of water in the presence of a catalytic amount of a compound selected from the group consisting of

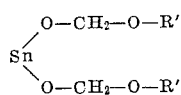

and

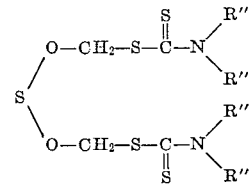

wherein R' represents the acyl radical of an acid selected from the group consisting of alkanoic acids containing up to 18 carbon atoms and substituted and unsubstituted benzoic, phenylacetic and cyclohexanoic acids, the substituents of said substituted acids being selected from the group consisting of halogen, nitro, hydroxy, etherified hydroxy and alkyl and each R'' is selected from the group consisting of alkyl and phenyl, at temperatures of from about −20 to 120° C. and recovering resulting high molecular weight polyoxymethylene.

2. The process of claim 1, wherein said polymerizing is carried out in the presence of a high molecular weight polyoxymethylene, said high molecular weight polyoxymethylene being present in the form of a fluidized bed.

3. The process of claim 1 wherein said polymerization is carried out in the presence of a member selected from the group consisting of methylene chloride, 1,2-dichloropropane, carbon tetrachloride, toluene, ethylacetate, acetic anhydride, orthofumaric acid ethyl ester and formaldehyde-dimethylacetal.

4. The process of claim 3 wherein said agent is acetic anhydride.

References Cited by the Examiner

UNITED STATES PATENTS

| | | | |
|---|---|---|---|
| 2,848,437 | 8/1958 | Langsdorf et al. | 260—67 |
| 3,155,636 | 11/1964 | Kritzler et al. | 260—67 |
| 3,161,617 | 12/1964 | Kritzler et al. | 260—67 |
| 3,232,906 | 1/1966 | Wagner | 260—67 |

OTHER REFERENCES

Kern et al., Angewandte Chemie., vol. 73, No. 6, pp. 177–186 (pp. 184-185 relied on), March 1961.

WILLIAM H. SHORT, *Primary Examiner.*

L. M. MILLER, *Assistant Examiner.*